(12) United States Patent
Bohatsch et al.

(10) Patent No.: US 8,816,552 B2
(45) Date of Patent: Aug. 26, 2014

(54) ELECTRIC MOTOR WITH INTEGRATED ELECTRICAL COMPONENTS IN THE B FLANGE

(75) Inventors: Elmar Bohatsch, Braunau am Inn (AT); Johann Eder, Michaelbeuern (AT); Alois Holzleitner, Braunau am Inn (AT); August Huber, Mining (AT); Bernd Lutz, Tarsdorf (AT); Roland Scharinger, Handenberg (AT); Christian Schneider, Hochburg-Ach (AT); Harald Unterberger, Anthering (AT)

(73) Assignee: Bernecker + Rainer Industrie-Elektronik Ges.m.b.H., Eggelsberg (AT)

( * ) Notice: Subject to any disclaimer, the term of this patent is extended or adjusted under 35 U.S.C. 154(b) by 226 days.

(21) Appl. No.: 13/432,707

(22) Filed: Mar. 28, 2012

(65) Prior Publication Data

US 2013/0154414 A1 Jun. 20, 2013

(30) Foreign Application Priority Data

Dec. 16, 2011 (AT) .......................... GM50003/2011 U

(51) Int. Cl.
*H02K 5/00* (2006.01)
(52) U.S. Cl.
USPC ........................................................... 310/89

(58) Field of Classification Search
CPC ................................ H02K 5/04; H02K 5/225
USPC ......................................................... 310/89, 88
See application file for complete search history.

(56) References Cited

U.S. PATENT DOCUMENTS

| | | | | |
|---|---|---|---|---|
| 7,453,179 | B2 * | 11/2008 | Innami et al. ................... | 310/89 |
| 2003/0193251 | A1 * | 10/2003 | Long .............................. | 310/89 |
| 2005/0258691 | A1 * | 11/2005 | Furuki ............................. | 310/89 |
| 2008/0018184 | A1 * | 1/2008 | Seufert et al. ............... | 310/68 B |
| 2011/0095630 | A1 * | 4/2011 | Jiang et al. ...................... | 310/72 |

FOREIGN PATENT DOCUMENTS

DE    10 2004 025 812    12/2005

* cited by examiner

*Primary Examiner* — Hanh Nguyen
(74) *Attorney, Agent, or Firm* — Greenblum & Bernstein, P.L.C.

(57) ABSTRACT

The different electrical components and cables arranged in the B flange of an electric motor can be installed only with difficulties and are complicated and time-consuming due to the restricted space conditions in the B flange. In order to improve this, it is proposed to recess the B flange's 3 front side 10 facing away from the electric motor 1 at least in sections with respect to an imaginary surface normal to the longitudinal axis 15 of the electric motor 1 in the direction toward the motor housing 2, and to shape the B flange cover's 9 front face resting against the B flange 3 in a mirror-inverted manner to thereby improve the accessibility to the inside of the B flange 3.

5 Claims, 3 Drawing Sheets

ELECTRIC MOTOR WITH INTEGRATED ELECTRICAL COMPONENTS IN THE B FLANGE

Figure 1:
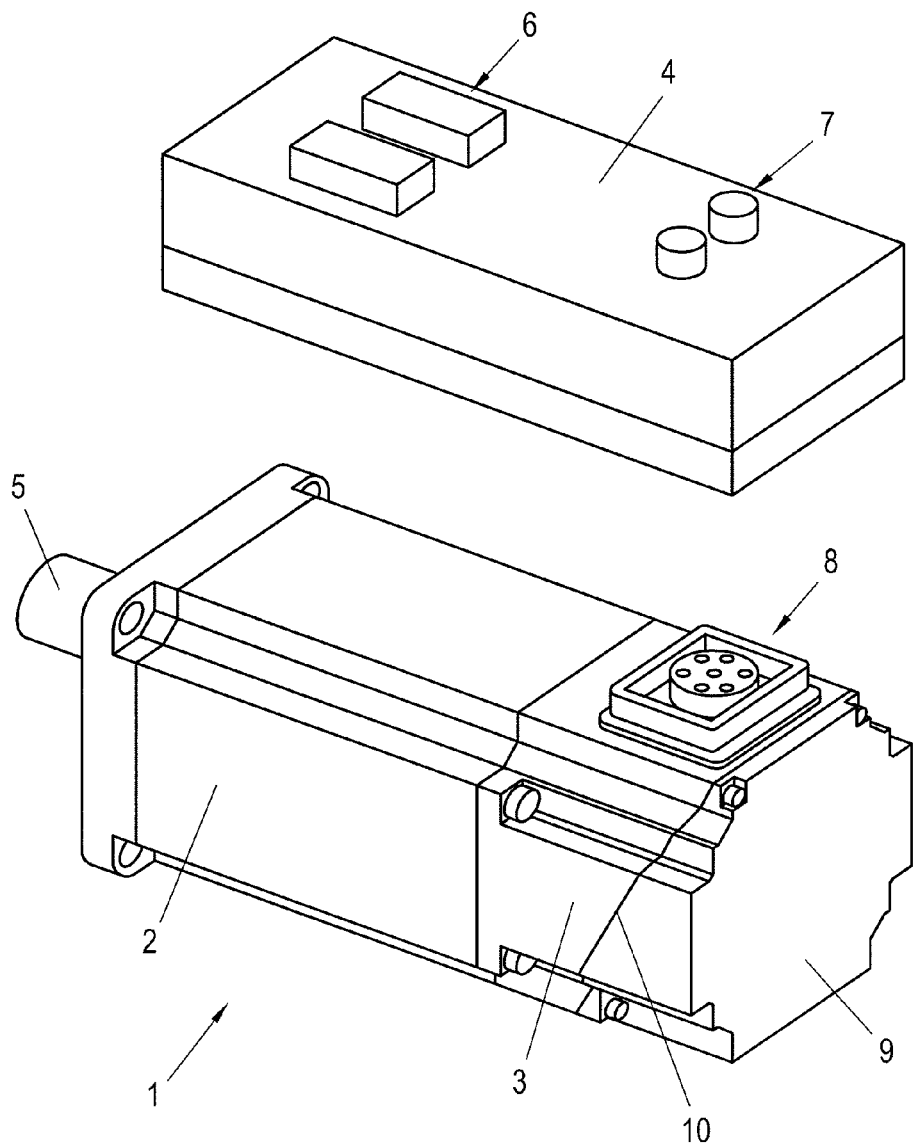

The present application claims priority under 35 U.S.C. §119(a) of Austrian Patent Application No. GM 50003/2011 filed Dec. 16, 2011, the disclosure of which is expressly incorporated by reference herein in its entirety.

The present invention relates to an electric motor comprising a motor housing and a B flange which is arranged on the electric motor's axial end opposite to the power take-off, wherein said B flange accommodates at least one electrical component, the B flange is closed by a B flange cover, and in a side face of the B flange, a recess for receiving a connector plug is provided.

Today's electric motors, in particular for industrial applications, need to have high power densities and a very compact design in order to be able to use them in machines and plants. Electric motors installed in machines or plants are often supplied via very long supply cables from central converters which, however, due to the space required in the control cabinet, the need of air conditioners for cooling the control cabinet, required expensive cables and the insulation stress due to cable reflections is very disadvantageous. Also, for controlling the electric motors, position or speed sensors are often required which detect the angular position or rotational speed of the motor shaft. For these reasons, among others, electric motors have been developed which integrate electrical components such as components of the converter, position or speed sensors, but also control units. An example for this is described in DE 10 2004 025 812 A1 which shows an electric motor, on the B side (the side facing away from the output side) of which in a B flange, a motor status monitoring device such as a position sensor, and also a component of the motor supply, in particular an intermediate circuit capacitor of a converter, an inductor, a line filter, etc. are arranged without increasing the outer contour of the electric filter. Furthermore, a converter can be arranged on the electric motor. At the B flange, a recess is provided for receiving a plug connector in order to be able to connect the electrical component of the motor supply to the converter. Thereby, a particularly compact design is achieved wherein the free space available in the B flange can be utilized effectively. The disadvantage is that due to the B flange filled in this manner, the different components and cables can be mounted only with difficulties. Due to the space that is already restricted from the outset and the limited accessibility, wiring in the housing is complicated and time-consuming.

It is therefore an object of the present invention to provide an electric motor with electrical components which offers a simplification with regard to the installation.

This object is achieved according to the invention in that the B flange's front face facing away from the electric motor is recessed at least in sections with respect to an imaginary surface normal to the longitudinal axis of the electric motor in the direction toward the motor housing, and the B flange cover's front face resting against the B flange is shaped in a mirror-inverted manner. Thereby, the inside of the B flange is more accessible which makes wiring in the very restricted narrow interior in the B flange much easier. Possible advantageous embodiments are diagonally cut or stepped front faces of the B flange and the B flange cover.

Figure 3:
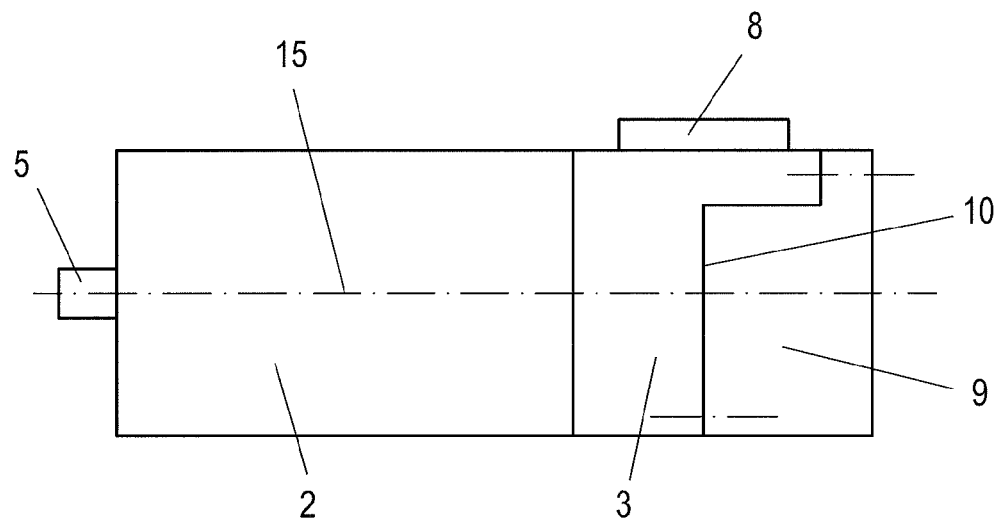
Figure 4:
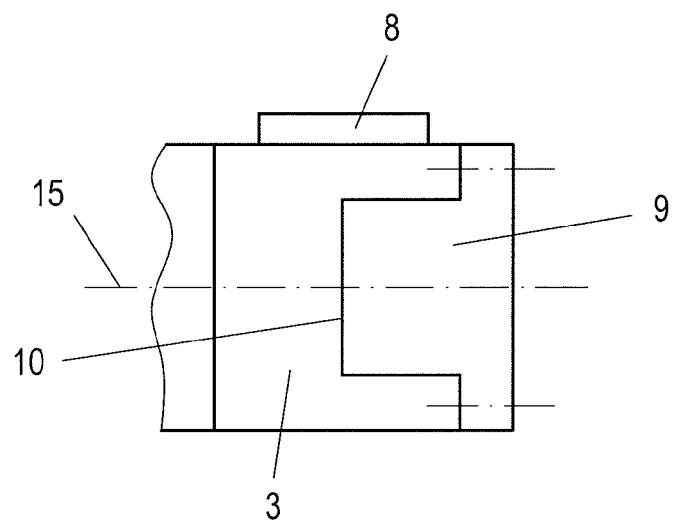

The present invention is explained hereinafter with reference to the FIGS. 1 to 4 which, schematically and exemplary, show advantageous configurations of the invention. In the figures FIG. 1 shows an electric motor according to the invention, FIG. 2 shows an exploded view of an electric motor according to the invention with open B flange, and FIGS. 3 and 4 show further advantageous configurations of the front faces between B flange and B flange cover.

FIG. 1 shows an electric motor 1 according to the invention. The electric motor 1 comprises a motor housing 2 in which rotor, stator and shaft of the electric motor 1 are arranged in a manner known per se which is not described here in more detail. On the power take-off side, the motor shaft 5 protrudes out of the electric motor 1. On the B side, thus on the electric motor 1 end opposing the power take-off, a B flange 3 is arranged on the motor housing 2, in which B flange, the electrical components are arranged, as described below in more detail with reference to FIG. 2. Said B flange 3 is closed by a B flange cover 9. Also arranged on the electric motor 1 is a motor supply unit 4 which, e.g., can comprise a converter and a control unit. On the motor supply unit 4, plugs 6 for the power supply of the electric motor 1 and plugs 7 for control connections, e.g., for connecting to a central control unit or a fieldbus, can be provided. Also provided on the B flange 3 is a connector plug 8 which feeds the necessary electrical lines of the motor supply unit 4 into the interior of the B flange 3. The motor supply unit 4 has a corresponding (not illustrated here) jack for contacting the connector plug 8. The connector plug 8 thus enables a simple assembly and disassembly of the motor supply unit 4 on the electric motor 1, as indicated in FIG. 1.

Figure 2:
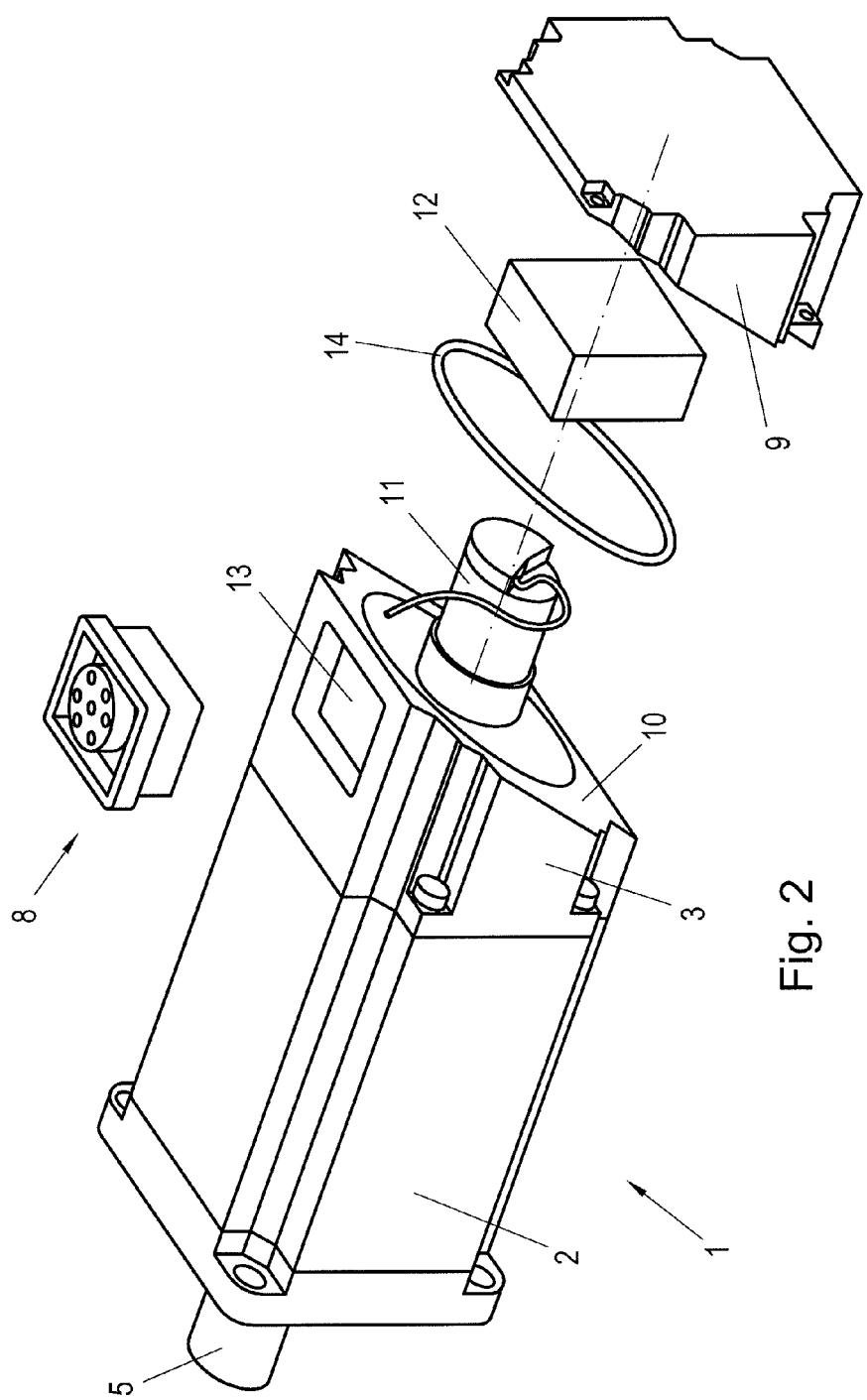

FIG. 2 shows exemplary embodiments of electrical components within the B flange 3, e.g., a position sensor 11 and axially adjacent thereto, a capacitor 12, e.g., an intermediate circuit capacitor of the converter, is arranged. The connector plug 8 is arranged in a recess 13 of the B flange, wherein the recess 13 is provided in a longitudinal side of the B flange 3. The front face 10 which is facing away from the electric motor 1 is diagonally cut here, namely in such a manner that the axial length of the B flange 3 is larger in the region of the recess than the axial length on the opposite or on another longitudinal side. The B flange cover 9 is cut in a mirror-inverted manner. Between B flange 3 and B flange cover 9, a sealing unit 14 such as, e.g., an O-ring, can be arranged.

In general, the front face 10 is recessed at least in sections with respect to an imaginary surface normal to the longitudinal axis 15 toward the motor housing 2 so that the inside of the B flange 3 becomes easier accessible. For logical reasons, the B flange 3 has the greatest axial length in the region of the recess 13. The B flange cover's 9 front side resting against the B flange 3 is always shaped in a mirror-inverted manner so as to close the B flange 3, i.e. that the B flange cover 9 has corresponding axial projections which are shaped in a mirror-inverted manner.

Accordingly, as an alternative, instead of a diagonally cut front face 10 of the B flange 3, a front face 10 cut in a step-shaped manner could also be provided, as illustrated in FIG. 3. The step is arranged here again in such a manner that the axial length in the region of the connector plug 8 is greater than on the opposing longitudinal side, whereby the accessibility to the inside of the B flange 3 is improved again. Also conceivable is a double step as illustrated in FIG. 4.

In the above-described examples, the cross-section of the motor housing 2 and the B flange 3 is rectangular. Of course, any other cross-sectional shape, e.g. round, elliptical, etc., is also conceivable.

In the B flange 3, a multiplicity of cables and wires are required which are not illustrated here for clarity reasons. These are, e.g., wires for connecting the capacitor 12 to the motor supply unit 4, wires for connecting the position sensor 11 to the motor supply unit 4, and wires for connecting the motor supply unit 4 to the windings of the electric motor 1. If additional electrical components are arranged in the B flange 3, additional wires might be added thereto. The recessed front face 10 of the B flange 3 improves the accessibility of the interior of the B flange 3, which makes the necessary wiring work much easier.

The B flange cover 9 is preferably made from a thermally insulating material such as, e.g., plastic, so as to be able to better thermally decouple the electrical components, here the capacitor 12, arranged at the axial end of the B flange 3 or in the B flange cover 9, from the electric motor 1.

The invention claimed is:

1. An electric motor comprising:
    a motor housing and
    a B flange which is arranged on an axial end of the electric motor opposite to a power take-off,
    wherein the B flange accommodates at least one electrical component, the B flange is closed by a B flange cover, and a recess is provided in a side face of the B flange for receiving a connector plug,
    wherein a front side of the B flange facing away from the electric motor is recessed at least in sections with respect to an imaginary surface normal to a longitudinal axis of the electric motor in the direction toward the motor housing, and a front face of the B flange cover resting against the B flange is shaped in a mirror-inverted manner, and
    wherein the front faces of the B flange and of the B flange cover are cut diagonally.

2. The electric motor according to claim 1, wherein for better thermal decoupling, the B flange cover comprises a thermally insulating material.

3. An electric motor having a power take-off side and an axial end opposite the power take-off side along a longitudinal motor axis, the electric motor comprising:
    a motor housing;
    a B flange being arranged on the axial end, wherein the B flange is structured and arranged to accommodate at least one electrical component;
    a B flange cover structured to close the B flange;
    the B flange having a side face with a recess structured and arranged to receive a connector plug and having a front side facing away from the power take-off side that is recessed at least in sections with respect to an imaginary surface normal to the longitudinal motor axis in a direction toward the motor housing; and
    the B flange cover having a front face that is structured and arrange in a mirror-inverted manner to the B flange to rest against the B flange,
    wherein the front faces of the B flange and the B flange cover are oriented diagonally to the longitudinal axis.

4. The electric motor according to claim 3, wherein the B flange cover comprises a thermally insulating material.

5. The electric motor according to claim 3, wherein the diagonal orientation of the front faces of the B flange and the B flange cover is structured in a stepped manner.

* * * * *